May 13, 1952 C. H. SCOTT 2,596,607
LUBRICATOR
Filed March 23, 1949 3 Sheets-Sheet 1
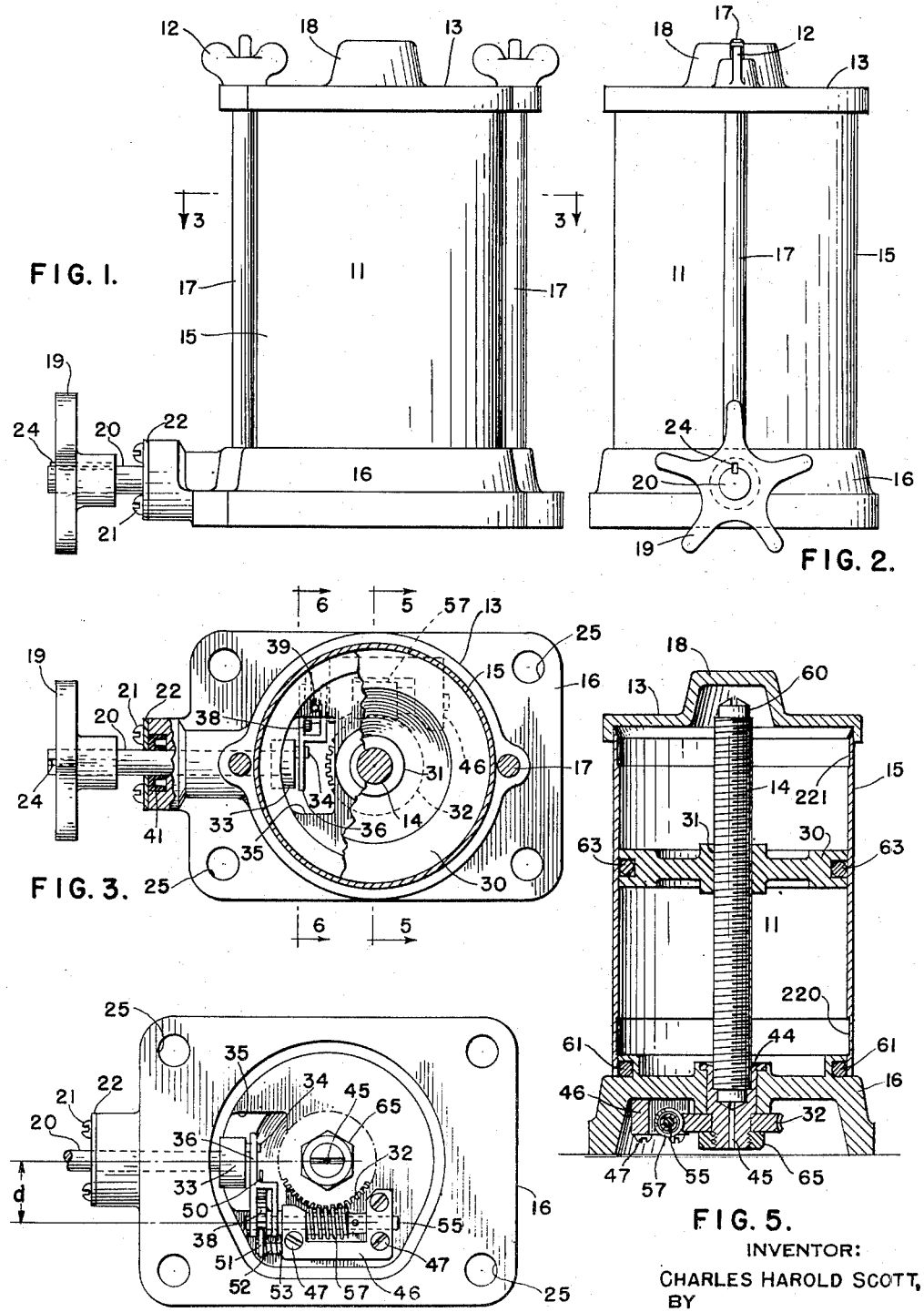
INVENTOR:
CHARLES HAROLD SCOTT,
BY
Arthur Middleton
ATTORNEY May 13, 1952  C. H. SCOTT  2,596,607
LUBRICATOR
Filed March 23, 1949  3 Sheets-Sheet 2
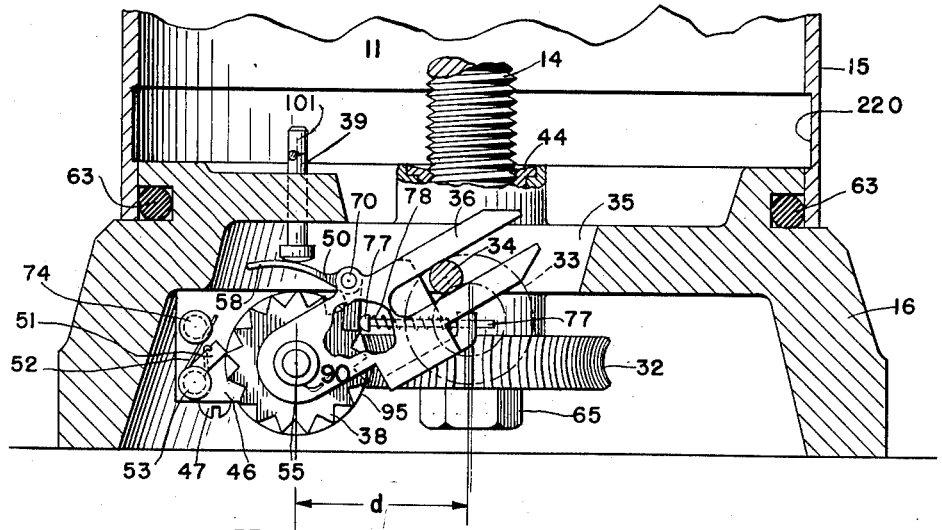
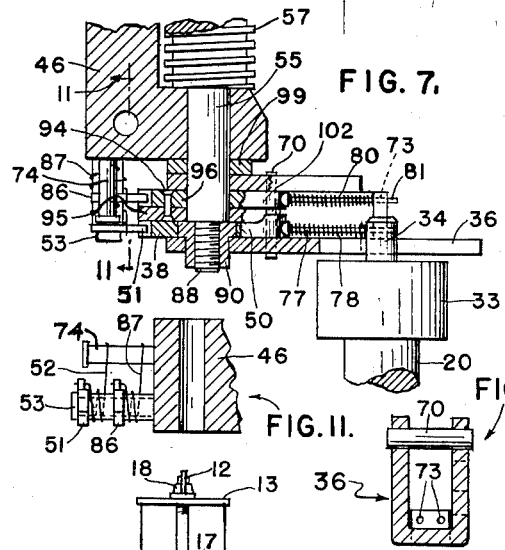
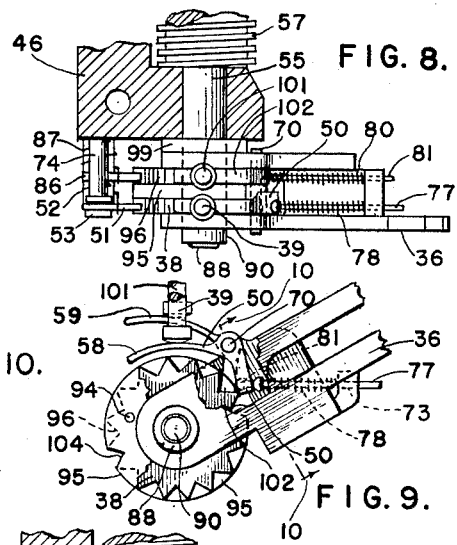
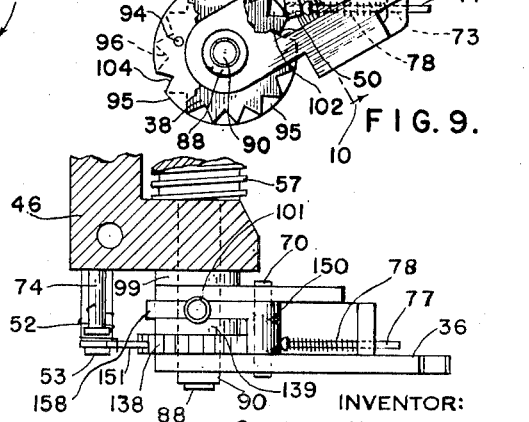
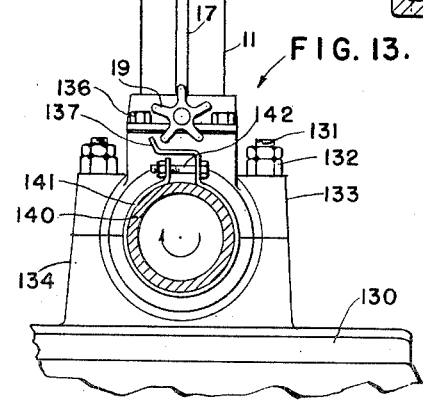
INVENTOR:
CHARLES HAROLD SCOTT,
BY
Arthur Middleton
ATTORNEY May 13, 1952 C. H. SCOTT 2,596,607
LUBRICATOR
Filed March 23, 1949 3 Sheets-Sheet 3
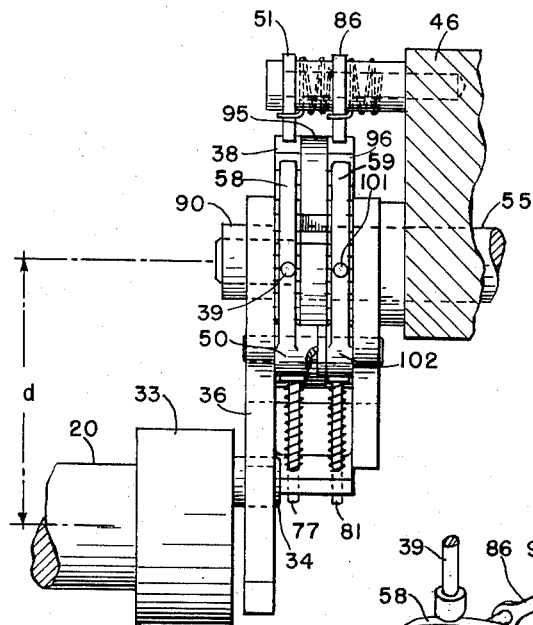
FIG. 14.
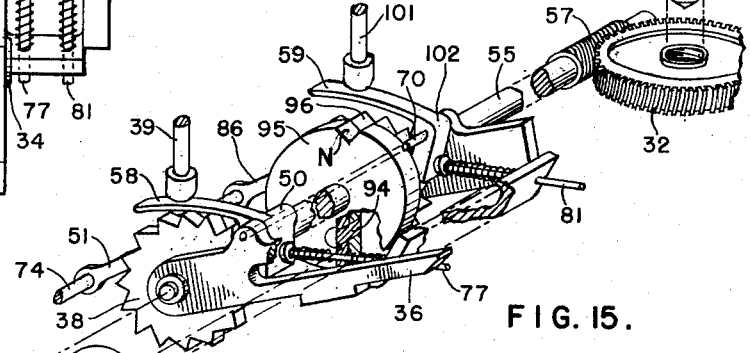
FIG. 15.
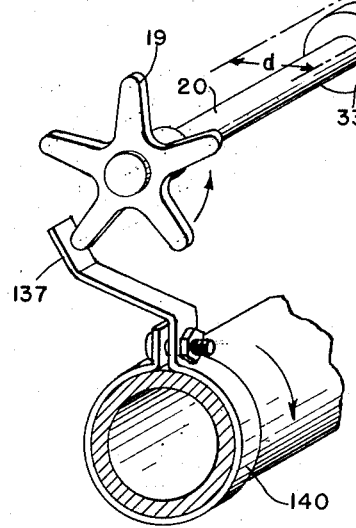
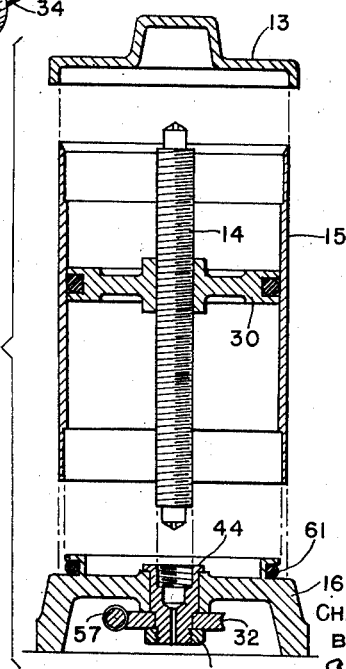
FIG. 16.
INVENTOR:
CHARLES HAROLD SCOTT,
BY
Arthur Middleton
ATTORNEY Patented May 13, 1952

2,596,607

UNITED STATES PATENT OFFICE 2,596,607

LUBRICATOR

Charles Harold Scott, Westport, Conn., assignor to The Dorr Company, Stamford, Conn., a corporation of Delaware Application March 23, 1949, Serial No. 83,011

6 Claims. (Cl. 184—37)

This invention relates to an automatic force-feed lubricator wherein a viscous lubricant such as heavy oil or grease is delivered to a rotating or oscillating bearing at a very slow rate. It is particularly adaptable for use on bearings which are submerged in liquid and are relatively inaccessible; such bearings are found in machines which are used for flocculating, clarifying, etc., large bodies of water and which ordinarily are serviced at infrequent periods, of the order of one year or more.

The novel features of this invention are defined precisely in the appended claims; reference is made thereto for the limitations of this invention. Thus, the descriptions of specific embodiments given below are not to be taken as necessarily limiting the invention.

In a pending U. S. patent application (Serial No. 708,871, entitled "Bearing with Automatic Lubricator," and filed November 9, 1946) now U. S. Patent No. 2,507,579 granted May 16, 1950, there is shown an automatic lubricator suitable for similar purposes as this invention, i. e., automatic slow force-feed lubrication of bearings where the movement of the shaft within the bearings is utilized to operate the mechanism of the lubricator. While the lubricator shown therein is a very useful machine, it has some limitations, to wit, its range of adjustment is rather narrow, adjustments in the mechanism require fairly extensive disassembling of the machine, some parts are rather difficult to construct, etc. But importantly, the arrangement of the mechanism is such that installations must be made with care in order to insure operability and positive delivery of the lubricant. The present invention overcomes the limitations indicated.

In a simple embodiment, the lubricator has a hollow base structure adapted to be attached securely to a bearing, a detachable grease cylinder mounted to the base, a piston-structure within the cylinder which frictionally engages the walls of the cylinder tightly enough to minimize rotation of the piston, a rotatable drive-screw whose rotation pulls the piston down toward the base and forces lubricant to the bearing, a cap for the cylinder, and speed-reducing mechanism for rotating the drive screw. It may be remarked that the lubricator is especially adapted for operation wherein a long period (e. g. a year) elapses before the piston travels close to the base. A feature of this invention lies in the arrangement of the speed-reducing mechanism; this will be brought out clearly as this specification proceeds. A further feature of this invention lies in that the moving parts of the lubricator are contacted by the lubricant. Still another feature is that the cylinder, rotatable drive-screw and piston are reversible, so that when the piston approaches the base structure, the foregoing members may be demounted from the base and thereafter remounted at their opposite ends. By this means, the need for a laborious reverse rotation of the screw is avoided. An important feature lies in the construction of the speed-reducing mechanism so that rotation of the shaft in the bearing in any direction, or even only oscillatory motion of the shaft, imparts motion to the piston in a positive, lubricant-expelling manner; this insures lubrication of the shaft and bearing regardless of how either moves, i. e., clockwise, counter-clockwise, or in an oscillating manner.

A factor which is of importance in the construction of the lubricator relates to the speed-reducing mechanism or means. This is so arranged that, in addition to the multi-direction feature referred to above, wide variations in the speed-reduction ratio may be obtained simply by the replacement of only a small number of relatively inexpensive moving parts. This permits flexibility in adjusting the capacity and lubricant delivery rate of the lubricator, while still permitting standardization and interchangeability of nearly all the moving parts. The above features, and possibly others, however, are perhaps best explained by reference to the drawings wherein:

Fig. 1 is a vertical view of the lubricator which shows particularly the base, cylinder, cap and external driving mechanism.

Fig. 2 is a vertical side view of the lubricator showing the external driving mechanism or gear as a star wheel.

Fig. 3 is a horizontal sectional view taken along the plane indicated by the dot-and-dash line 3—3 of Fig. 1. In Fig. 3 parts of a piston have been broken away whereby to indicate the position and general arrangement of the speed-reducing mechanism.

Fig. 4 is a bottom view of the base-structure and associated parts illustrating the speed-reducing mechanism in more detail.

Fig. 5 is a vertical sectional view of the lubricator, which shows the general lay-out of the rotatable drive-screw and the piston within the lubricant cylinder.

Fig. 6 is a vertical sectional view of the base end of the lubricator, showing details of the speed-reducing mechanism.

2,596,607

3

Fig. 7 is a partial horizontal section illustrating the relative positions of ratchets, pins and worm shaft in an embodiment of the speed-reducing mechanism.

Fig. 8 is a view similar to Fig. 7 but shows in further detail the relative arrangement of ratchets, pawls and a notched disc in one embodiment of the speed-reducing mechanism.

Fig. 9 is a vertical view of the notched disc and pawl mechanism shown in Fig. 8, showing details thereof.

Fig. 10 is a cross-sectional view of a slotted ratchet carrying arm; this Fig. 10 is a view taken as on a plane indicated by dot-and-dash broken line 10—10 of Fig. 9 looking in the direction of the arrows.

Fig. 11 is a vertical view taken as on the plane indicated by the dot-and-dash line 11—11 of Fig. 7 looking in the direction of the arrows.

Fig. 12 is a horizontal view of an embodiment of a portion of the speed-reducing mechanism.

Fig. 13 is a vertical view of a lubricator mounted on the bearing of a rotating shaft, wherein a split ring clamped on the shaft imparts intermittent rotary motion to a star-wheel type of external driving means.

Fig. 14 is an enlargement and amplification of the plan view of that part of the drive mechanism which is shown in Fig. 8 embodying ratchet carryover mechanism. Fig. 15 is an isometric perspective view of a train of speed-reducing drive elements according to this invention from its high-speed end to its low-speed end.

Figure 16 is a somewhat diagrammatic vertical sectional view of the lubricator similar to Fig. 5, although with parts drawn apart.

More particularly in the drawings:

In Fig. 1 is shown the external appearance of the lubricator collectively designated 11. To hollow base-structure 16 there is detachably mounted lubricant cylinder 15; threaded rods 17 screw into base-structure 16 and also pass through holes in cylinder cap 13. Wing nuts 12 screw on rods 17 above cylinder cap 13 (which has dome 18) and thereby attach both cap 13 and lubricant cylinder 15 to base-structure 16. External wheel 19 is attached to drive shaft 20, which passes through shaft seal-retainer plate 22 to the internal portion of base-structure 16; shaft seal-retainer plate 22 is secured to base-structure 16 by screws 21.

Fig. 2 shows a side view of the exterior of the lubricator 11 wherein it is seen that the external-wheel 19 is a five-pointed star-wheel and is fixed to drive shaft 20 by means of a key 24 (or by a set screw which is not shown). In Fig. 3 it will be noted that a portion of the depending flange of the cylinder cap 13 is shown in section and that the upper end of the cylinder 15 is also shown in section. The piston-structure 30 which is within the cylinder 15 (which is shown as being partially broken away) also comprises therein packing-means (see reference 63 of Fig. 5) so that the entire piston-structure 30 is in firm frictional contact with cylinder 15; drive screw 14 engages the threaded portion 31 of the piston-structure 30. In base-structure 16 are found four bolt holes 25 for attaching the lubricator 11 to a bearing; drive shaft 20 passes through shaft seal-retainer 22 in base-structure 16. Screws 21 fasten shaft-seal-retainer 22 to base-structure 16 and hold packing shaft seal means 41 (such as oil resistant rubber) around drive shaft 20. Drive shaft 20 has crank disc 33 firmly attached thereto at its inner end; crank disc 33 is integral with crank pin 34 which slidingly engages slotted

4 ratchet arm 36 and thereby moves ratchet wheel 38 and worm gear 32 as will presently be described. An upper view of safety release pin 39 is shown as well as the relative position of lubricant passage 35 in base-structure 16.

Fig. 4 is a bottom view of base-structure 16. It particularly shows worm shaft bearing 46 attached to base-structure 16 by screws 47; worm 57 on worm shaft 55 rotates and drives worm gear 32. Worm gear 32 turns threaded hub 44 (having air vent 45) which is held in place by worm gear lock nut 65. Rotatable drive shaft 20 turns crank disc 33 and crank-pin 34 thereupon, thereby oscillating slotted ratchet arm 36, which is rotatably mounted on worm shaft 55. Drive shaft 20 and worm shaft 55 are compactly mounted and rotatable in base 16, that is both shafts are spaced a relatively small distance from each other, such compactness of arrangement being made feasible by the provision of lost-motion drive connection by the shafts 20 and 55 through the slotted arm 36. Within slotted ratchet arm 36 is rotatably mounted ratchet drive-pawl 50 which engages ratchet wheel 38. This wheel 38 is firmly mounted in worm shaft 55 and is prevented from reverse rotation by the back-stop or holding-pawl 51; holding-pawl 51 is rotatably mounted on fixed pin 53 attached to worm shaft bearing block 46. Torsion spring 52 forces holding-pawl 51 against ratchet wheel 38. This spring is maintained under torsion as one end portion is held in place by a resistor member as pin 74 of Figs. 7, 8 and 12 or 74 of Fig. 11.

Fig. 5 is a vertical section of lubricator 11. Cylinder cap 13 fits loosely over cylinder 15; dome 18 of cylinder cap 13 is arranged so that head 60 of drive-screw 14 does not contact cylinder cap 13. As shown, drive-screw 14 passes through threaded portion 31 of piston-structure 30 and by the rotation of drive-screw 14, piston-structure 30 moves downwardly within cylinder 15 thereby expelling lubricant from within the cylinder 15. Piston-structure 30 is grooved about its periphery and therein is inserted packing-means 63, which is preferably formed of oil-resistant rubber in the shape of a doughnut, though plastic, leather, etc. or even a spring-actuated metallic ring may be used. Drive-screw 14 is symmetrical i. e., its upper and lower ends are slotted and otherwise identically shaped and thus either end may be screwed into internally-threaded rotatable hub 44; hub 44 is attached to worm gear 32 and is held firmly in position by worm gear lock nut 65. It is preferred that worm gear lock nut 65 be of hard metal and have projecting spurs engaging worm 32, thereby locking hub 44 and worm gear 32 together. Worm bearing 46, attached to base-structure 16 by screws 47 contains worm 57 and worm shaft 55. Base-structure 16 is constructed so that packing-element 61 may be inserted between the top portion of base-structure 16 and the lower portion of cylinder 15. Cylinder 15 is likewise symmetrical i. e. both its top and bottom portions are identical in structure.

Fig. 6 is an enlarged vertical sectional view of the bottom portion of lubricator 11 and illustrates the co-acting relationship of parts of the speed-reducing mechanism. As shown, worm gear lock nut 65 screws on to the threaded portion of hub 44 (see Fig. 5) and serves for holding worm gear 32 in non-sliding engagement with hub 44. As the crank disc 33 rotates crank-pin 34 slidingly engages slot of ratchet arm 36, thereby imparting oscillatory motion of ratchet arm 36 around worm shaft 55. Drive-pawl 50 is rotatably mounted on pin 70 on ratchet arm 36. As shown, when ratchet arm 36 moves down, the lower end of drive-pawl 50 moves ratchet 38 one notch for every complete revolution of bushing 33; drive-pawl 50 is held against ratchet 38 by the action of pawl push pin 77 slidingly mounted in opening as 73 on ratchet arm 36. Pawl push pin 77 is actuated by compression spring 78. As ratchet arm 36 moves upward, reverse rotation of ratchet 38 is prevented by the engagement of hold-pawl 51 against a notch on ratchet 38; in turn, hold-pawl 51 is rotatably mounted on pin 53 on bearing 46. Hold-pawl 51 is forced against ratchet 38 by the action of torsion spring 52, which is mounted on fixed pin 74 and pin 53. It is to be noted that as drive-screw 14 rotates, piston-structure 30 (not shown in Fig. 6) may closely approach hollow base-structure 16; continued and increasing pressure of piston-structure 30 against base-structure 16 could result in injury to the speed-reducing mechanism. To prevent such injury, this invention contemplates several methods, two of which are shown in Fig. 6. Thus, the lower portions of cylinder 15 may be enlarged internally (as shown by reference 229 of Figs. 6 and 5) so that at the lower limit of travel of piston-structure 30, it will simply rotate with drive-screw 14, thereby minimizing further downward motion of piston-structure 30. Another means of safety release is also shown, wherein release pin 39 is slidingly and vertically mounted in base-structure 16. This pin 39 projects above the base-structure 16 and the lower end thereof extends downwardly to a position whereat when moved downwardly a certain distance it engages an arm extension 58 of a drive-pawl 50. This pin 39 is disposed so that should piston-structure 30 approach base-structure 16 closely, further travel will depress release pin 39 to engage and depress the arm extension 58 sufficiently to thereby force drive-pawl 50 away from contact with ratchet wheel 38. Thereafter continued oscillation of ratchet arm 36 fails to impart motion to drive-screw 14. These safety means may be used singly or jointly.

Fig. 7 is a partial horizontal sectional view and this in conjunction with Figs. 8 to 11 inclusive illustrate an embodiment of the speed-reducing mechanism, whereby various speed ratios can be incorporated in lubricator 11 in manufacture or adjustment simply by changing a small number of simple parts. As in previous embodiments described, drive shaft 20, crank disc 33 and crank 34 impart oscillatory motion to ratchet arm 36 around the axes of worm shaft 55; hub 90 screwed on the threaded portion 88 of worm shaft 55 firmly secures ratchet wheel 38 to said shaft. Drive-pawl 50, pawl push pin 77 and back-stop or holding pawl 51 are positioned as hereinbefore described. However, slidingly mounted on worm shaft 55 are idler ratchet wheel 96 and notched disc 95, the latter being adjacent ratchet 38 and being shown to have provided thereon at the periphery of a single notch N; notch disc 95 and idler ratchet 96 are fastened together, as by rivet 94, so that rotation of idler ratchet 96 around worm shaft 55 imparts concomitant rotation to notched disc 95. Notched disc 95, ratchet wheel 38 and idler ratchet 96 are shown to have the same maximum diameter; this is not always necessary so long as the notches of notched disc 95 and ratchet 38 are the same distance from shaft 55 and can each engage the same pawl. The purpose of this construction is made clear in Figs. 8 and 9 wherein the arrangement of the pawls is emphasized. Therein is shown washer 99 spacing the ratchet arm 36 on worm shaft 55 from the bearing block 46. Pawl pins 81 and 77 slidingly mounted on and carried by the ratchet arm 36 are actuated by compression springs 80 and 78 respectively, force idler pawl 102 against idler ratchet wheel 96 and drive-pawl 50 against notched disc 95 and ratchet wheel 38 respectively. Only ratchet wheel 38 actuates worm shaft 55, both idler ratchet wheel 96 and notched disc 95 connected thereto being slidingly supported on worm shaft 55. As indicated, drive pawl 50 is wide enough to engage notches on both ratchet wheel 38 and notched disc 95, whereas idler pawl 102 may engage only idler ratchet wheel 96. Since the maximum diameter of notched disc 95 is at least equal and preferably greater than that of ratchet wheel 38, drive-pawl 50 normally is only in sliding contact with the smooth peripheral portion of notched disc 95 and no motion is then imparted to ratchet 38. However, when a notch on notched-disc 95 coincides with a notch on ratchet wheel 38 at drive pawl 50, drive-pawl 50 falls into the respective coinciding notches and the motion of idler ratchet 96 results in impelling ratchet 38 only one notch. Thus, though continued oscillating motion may be imparted to ratchet-arm 36 worm shaft 55 is actuated only when a notch on notched-disc 95 coincides with a notch on ratchet wheel 38 at pawl 50 but in the present embodiment of the drawings only one notch N is shown by way of example; if notched-disc 95 has only one notch, a complete revolution of idler ratchet 96 is necessary to move worm shaft 55 a fraction of a revolution. As circumstances dictate, notched-disc 95 may have several notches. Consequently, suitable arrangement of ratchets 96, 38 and notched-disc 95 permits wide variation in speed-reduction and the resulting motion imparted to piston 30.

In Figs. 7, 8 and 11 there is clearly shown the organization and arrangement whereby back-stop pawls 51 and 86 are respectively continually pressed by torsion springs 52 and 87 into hold-back engagement with the outlying ratchet wheel 38 and the inlying idler ratchet wheel 96.

In conjunction with the foregoing description respecting the showing of Figs. 8 and 9, it will be noted that the construction described will function in a practical way even if there should be omitted the safety-release pin 39—safety pin 101 being retained. Also in such case the pawl 50 would be retained but the arm extension 58 thereof could be omitted.

When the safety release pins 39 and 101 are both used they are preferably of the same operative length.

In Fig. 12 there is illustrated a modified form of drive which functions in principle along the lines outlined. In this instance the ratchet wheel 138 is the same as 38 except it has a long hub portion 139. A drive-pawl 150 is pivotally mounted in the slotted ratchet arm 36 and is constructed whereby the pawl drives and engages the ratchet wheel and whereby an arm extension 158 thereof is positioned to underlie release pin 101.

The back-stop pawl of Fig. 12 is designated as 151 and has a hub portion extending the full length of the pin 53. This stop pawl is normally passed against the ratchet wheel 138. The driving pawl is continually pressed into engagement with the ratchet wheel by the pawl engaging pin 77 and compression spring 78. The pawl actuating mechanism functions along the lines already described.

Fig. 13 is a sectional view of lubricator 11 attached to a bearing mounted on base 130. Bearing-top 133 is rigidly mounted on bearing-base 134 by stud bolts 131 and nuts 132; bolts 136 secure lubricator 11 to bearing-top 133. Rotatable shaft 140 shown in section as a hollow shaft is supported within the bearing and projects outwardly therefrom a sufficient distance to hold split ring clamp 141. The latter is firmly secured to shaft 140 by nut bolt 142; spur 137 on clamp 141 engages with projections on star-wheel 19. Thus a complete revolution of shaft 140 will result in movement of star-wheel 19 one projection. Suitable adjustment of either star-wheel 19 or the internal speed-reducing mechanism (not shown in Fig. 13 but previously described herein), may be made for variations in the speed of rotation of the worm gear relative to that of shaft 140.

*Operation*

In operating the lubricator on a bearing for submerged flocculating apparatus the following general sequence is preferably followed. The cylinder cap 13 is removed and drive-screw 14 unscrewed, thus releasing cylinder 15, drive screw 14 and piston-structure 30 from the base 16. The assembly is then removed from the base, and drive screw 14 adjusted so that piston-structure 30 is near the top of cylinder 15. Thereafter cylinder 15 is packed with the desired lubricant, such as a waterproof type grease.

Thereafter, the cylinder assembly is connected to the base structure and the latter bolted to the bearing. Star wheel or gear 19 is then adjusted so that positive contact may be made with clamp 141 on shaft 140 as the latter rotates. Thus, rotation of the shaft 140 in any direction, or even oscillation of the shaft, will impart slow, positive grease-expelling motion to the piston-structure 30 of lubricator 11.

It is not unusual for flocculating apparatus to be submerged in a tank or basin of water for long periods. A year of continuous operation is not an uncommon period between drainings. During such a period, lubrication of the bearings must coincide with the shaft or bearing movements and little, if any, attention can be given to the lubricator. Thus, my invention solves the difficulty of securing positive, yet slow, lubrication without attention for a long period of time and in normally inaccessible places. Should the operator be careless in connecting the lubricator to the bearing, no harm can result (so long as the clamp can engage the star wheel or gear) because of the foolproof nature of the speed-reducing mechanism. Furthermore, if the normal period of operation is extended through intent, accident or neglect, the lubricator mechanism will not break due to the safety release features. And finally when the time comes for refilling the cylinder with grease, it is only necessary to demount the cylinder, clean it, turn it upside down, re-pack it with lubricant and then re-attach it to the base. This may effect a significant saving in both time and labor during shut-downs.

Having now particularly described the structure and use of embodiments of this invention what I claim is:

1. A lubricator adapted for slow delivery of lubricant comprising a hollow base, a cylinder secured to the base and adapted to contain lubricant, an axially non-shiftable rotatable drive screw within and coaxial with the cylinder, a lubricant-expelling piston structure within the cylinder and centrally engaged by the screw, said piston structure being non-rotatable due to frictional contact with the inner face of said cylinder and adapted to expel lubricant from the cylinder through the base by rotation of the screw, speed-reducing means supported in and by the base for imparting stepwise motion to the screw, and having a drive shaft rotatable in said base, characterized by said speed-reducing means comprising a ratchet shaft having motion transmitting means between it and the screw, a first ratchet fixed upon said ratchet shaft, a second ratchet loose upon said shaft, a motion-transmitting device comprising an idler pawl for imparting stepwise rotation to said loose ratchet by the rotation of said drive shaft, and carry-over means associated with said loose ratchet, with said motion-transmitting device and with said fixed ratchet whereby periodical start-and-stop rotation is imparted to the fixed ratchet by and incident to the rotation of the loose ratchet.

2. A lubricator adapted for slow delivery of lubricant comprising a hollow base, a cylinder secured to the base and adapted to contain lubricant, an axially non-shiftable rotatable drive screw within and coaxial with the cylinder, a lubricant-expelling piston structure within the cylinder and centrally engaged by the screw, said piston structure being non-rotatable due to frictional contact with the inner face of said cylinder and adapted to expel lubricant from the cylinder through the base by rotation of the screw, speed-reducing means supported in and by the base for imparting stepwise motion to the screw and having a drive shaft rotatable in said base, a ratchet shaft having motion-transmitting means between it and the screw, pawl-and-ratchet means associated with said ratchet shaft and with said drive shaft to impart stepwise lubricant-expelling motion to said piston structure, the pawl having an outward extension constituting a lever arm whereby it can be swung out of engagement with its ratchet, and a motion transmitting device engageable by and actuated from the underside of said piston structure after that structure has closely approached its lubricant-expelling limit, for engaging and moving said pawl extension to effect disengagement of the pawl after the transmitting device has been thus engaged.

3. A lubricator according to claim 2, in which the transmitting device comprises a motion-transmitting pusher pin axially coextensive with the axis of the drive screw as well as axially slideable in said base, one end of said pin being adapted to be engaged by and actuated from the under side of said piston structure, the other end of said pin being adapted to engage said pawl extension for disengaging said pawl when the piston structure reaches its lubricant-expelling limit.

4. A lubricator according to claim 1, in which the carry-over means comprise a notched disc unitary and concentric with said loose second ratchet, a drive pawl actuated in unison with said idler pawl for imparting stepwise movement to the fixed first ratchet, said drive pawl being kept out of engagement with the fixed first ratchet while riding upon the periphery of said disc as the loose second ratchet rotates, said drive pawl being adapted to engage the fixed first ratchet as and when a notch in the disc periphery reaches the drive pawl, said drive pawl again to be disengaged from the fixed first ratchet by said notch moving past said drive pawl, whereby each revolution of the loose ratchet imparts to the fixed ratchet and thus to the ratchet shaft as many fractions of rotational movement as there are notches in said disc.

5. A lubricator adapted for slow delivery of lubricant to a bearing carrying a working shaft rotatable therein, comprising a hollow base adapted for attachment to the bearing, a cylinder secured to the base and adapted to contain lubricant, an axially non-shiftable rotatable drive screw within and coaxial with the cylinder, a lubricant-expelling piston structure within the cylinder and centrally engaged by the screw, said piston structure being non-rotatable due to frictional contact with the inner face of said cylinder and adapted to expel lubricant from the cylinder through the base to the bearing by rotation of the screw, speed-reducing means supported in and by the base for imparting stepwise motion to the screw, said speed-reducing means comprising a ratchet shaft rotatable in said base and extending transversely of said drive screw, an arm swingable about the outer end of said ratchet shaft, pawl-and-ratchet means associated with said ratchet shaft and with said arm for imparting stepwise lubricant-expelling motion to said piston structure when said arm is oscillated, said pawl having an extension constituting a lever arm whereby the pawl can be swung out of engagement with its ratchet, motion-transmitting means for oscillating said arm by rotation of said working shaft, automatic means for disengaging said pawl when the piston structure reaches its lubricant-expelling limit, comprising motion-transmitting means engageable by and actuated from the under side of said piston structure after that structure has closely approached its lubricant-expelling limit, said transmitting means in turn adapted to engage and move said pawl extension to effect disengagement of the pawl after the motion-transmitting means have been thus engaged.

6. A lubricator according to claim 5, in which the pawl has an outward extension constituting a lever arm whereby it can be swung out of engagement with its ratchet, an automatic means for disengaging said pawl from its ratchet when the piston reaches its lubricant-expelling limit, comprising a motion-transmitting pusher pin axially co-extensive with the axis of the drive screw as well as axially slideable in said base, one end of said pin being adapted to be engaged by and actuated from the under side of said piston structure, the other end of said pin being adapted to engage said pawl extension for disengaging said pawl when the piston structure reaches its lubricant-expelling limit.

CHARLES HAROLD SCOTT.

REFERENCES CITED

The following references are of record in the file of this patent:

UNITED STATES PATENTS

| Number | Name | Date |
|---|---|---|
| 811,917 | Hanson | Feb. 6, 1906 |
| 1,148,431 | Beierly | July 27, 1915 |
| 1,170,089 | Milne | Feb. 1, 1916 |
| 1,601,186 | Myers et al. | Sept. 28, 1926 |
| 1,917,125 | Jackson et al. | July 4, 1933 |
| 1,948,747 | Dunlap | Feb. 27, 1934 |

FOREIGN PATENTS

| Number | Country | Date |
|---|---|---|
| 18,154 | Great Britain | 1895 |